April 21, 1942.     T. A. BOWERS     2,280,744
SCAVENGER PISTON RING
Filed July 14, 1941     2 Sheets-Sheet 1
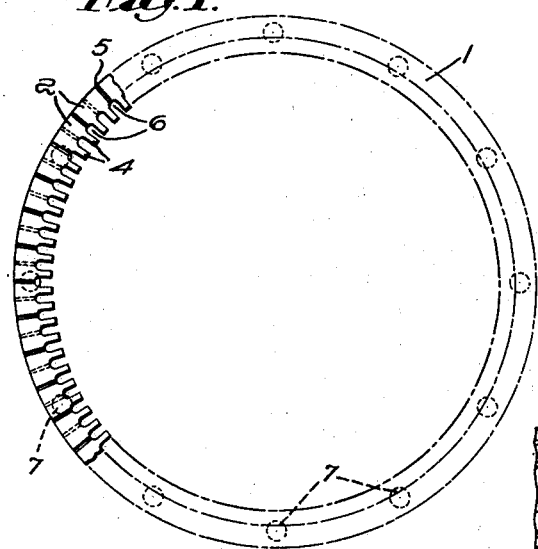
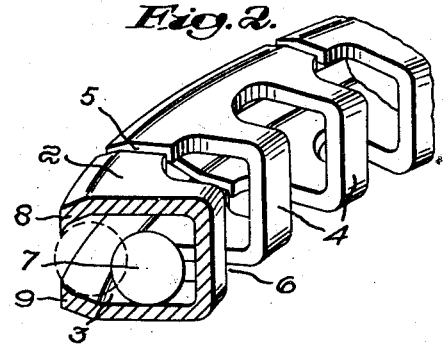
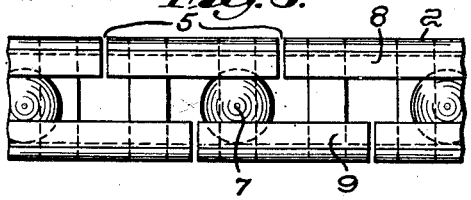
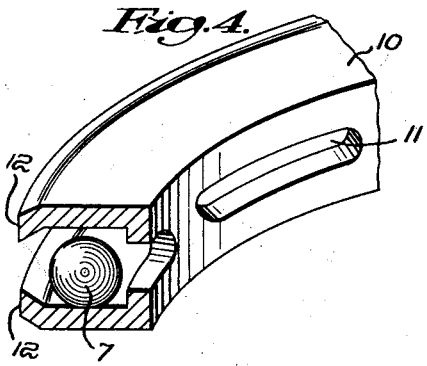
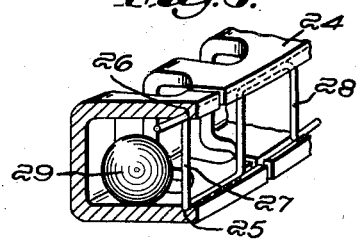
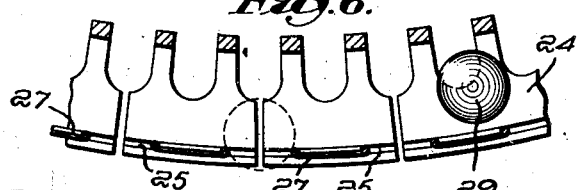
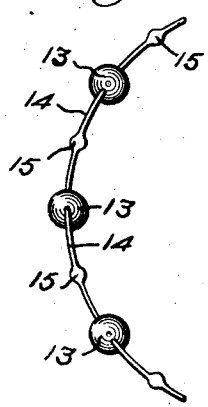
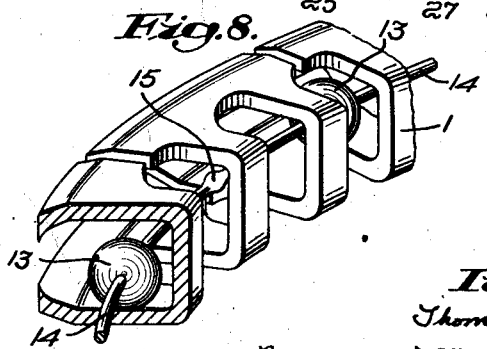
Inventor:
Thomas A. Bowers
Munn W. Hamilton
Attorney April 21, 1942.   T. A. BOWERS   2,280,744
SCAVENGER PISTON RING
Filed July 14, 1941   2 Sheets-Sheet 2

Inventor:
Thomas A. Bowers
by Marion H. Hamilton
Attorney

Patented Apr. 21, 1942

2,280,744

UNITED STATES PATENT OFFICE 2,280,744

SCAVENGER PISTON RING

Thomas A. Bowers, Mattapoisett, Mass., assignor to Power Research Corporation, Boston, Mass., a corporation of Massachusetts Application July 14, 1941, Serial No. 402,318

17 Claims. (Cl. 309—45)

This invention relates to piston rings and more especially to oil metering piston rings.

It is an object of the invention to improve piston rings and to devise an oil control ring having improved scavenger means for reducing or preventing carbon deposits on oil ring surfaces. The invention also aims to provide means for maintaining a plurality of scavenger elements in circumferentially spaced relation within a piston ring during all positions which may be assumed by the piston ring in operation in a cylinder. It is a further object of the invention to provide a simple, cheap, efficient, and easily installed oil control piston ring.

The nature of the invention, and its objects, will be more fully understood from the description of the drawings and discussion relating thereto.

In the accompanying drawings:

Fig. 1 is a plan view of the ring of the invention;

Fig. 2 is an enlarged fragmentary perspective view of the ring.

Fig. 3 is an enlarged fragmentary view in front elevation of the ring shown in Figs. 1 and 2;

Fig. 4 is a fragmentary perspective view of another piston ring assembly;

Figs. 5 and 6 are perspective and plan views respectively fragmentarily illustrating another piston ring assembly;

Figs. 7 and 8 are enlarged perspective views illustrating a modification of scavenger means of the invention;

Figure 9:
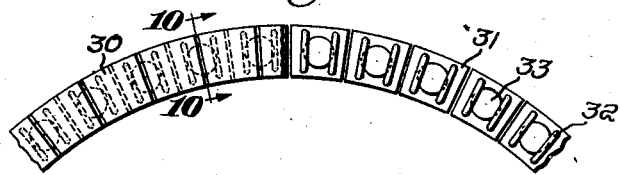
Figure 10:
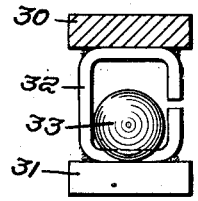
Figure 11:
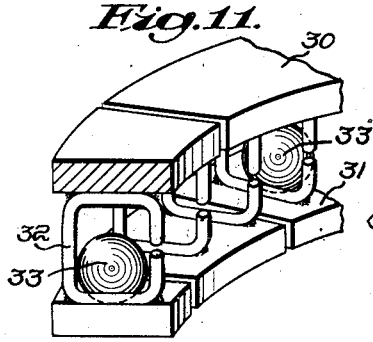
Figure 12:
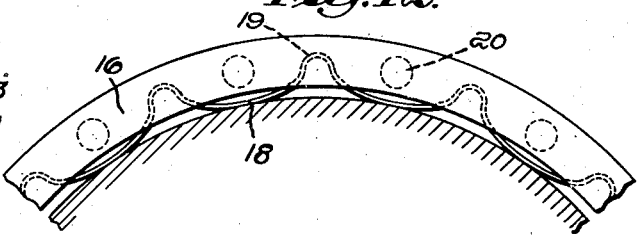
Figure 13:
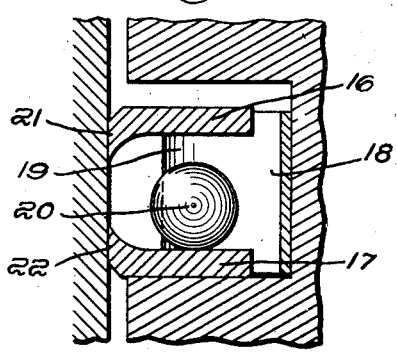
Figure 14:
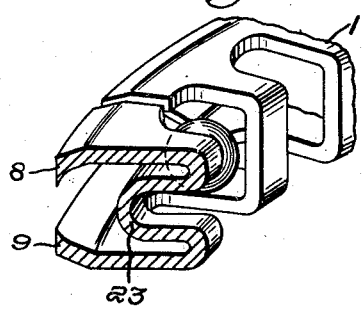
Figure 15:
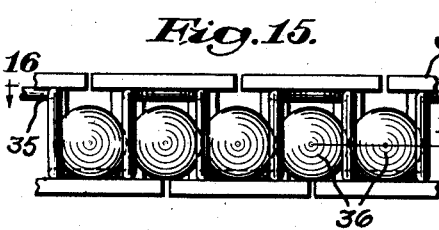
Figure 16:
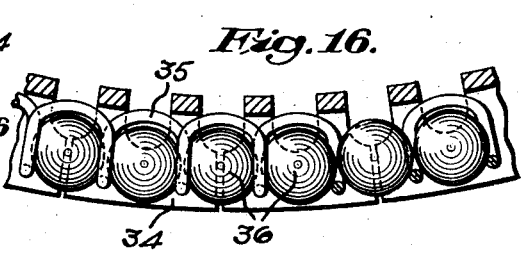
Figure 17:
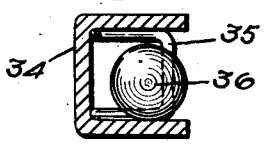

Figs. 9-11 inclusive illustrate another modification of piston ring;

Figs. 12 and 13 illustrate still another modification of piston ring;

Fig. 14 is a detail perspective view and partial cross section of another ring modification; and Figs. 15-17 inclusive illustrate still another modification of piston ring.

In the construction of oil control piston rings, it is customary to provide spaced-apart oil scraping edges adapted to bear against the wall of a cylinder during reciprocation of a piston therein. The space between the oil scraping edges serves as a reservoir for collecting oil removed from the cylinder wall by the oil scraping edges, and oil passages extending radially of the ring connect this space with the back of the piston ring groove. The piston is, in turn, formed with radial openings leading to the crankcase so that excess oil may be returned thereto. In an attempt to prevent carbon deposits clogging or filling in any of the oil passages, scavenger rings loosely mounted between the spaced-apart edges have been proposed. However, these scavenger rings fail to prevent carbon deposits entirely, especially in relatively small oil passages.

In accordance with the present invention, a plurality of relatively small scavenger elements are provided, which are of a character adapted to extend between, and engage against, the inner surfaces of the ring surrounding radially extending oil passages. In holding the scavenger elements within spaced-apart oil metering edges, a number of special retaining means have been devised, as will hereinafter appear.

Referring more in detail to the drawings, Figs. 1–3 inclusive illustrate a preferred embodiment of ring of the invention in which numeral 1 indicates an annular body made up of a plurality of segments 2 and 3 of piston ring material, arranged in annular rows and supported in axially spaced-apart relation by means of connecting portions 4.

The segments of each of the rows are arranged in circumferentially spaced-apart relation by openings as 5, which connect with relatively large openings 6, forming radial oil passages between the connecting portions 4. The openings 5 and 6 provide a series of overlapping slots which allow the segments to move circumferentially relatively to each other, and thereby impart flexibility to the annular body 1, as described in an earlier patent, No. 2,224,338, issued to me December 10, 1940.

Among other features, the ring of the present invention is distinguished from the ring of the above noted patent by having a plurality of scavenger elements 7 disposed in the space between the rows of segments. Preferably the scavenger elements 7 consist of a number of spherical bodies which are adapted to be readily set in rotation, and may for example comprise a number of steel balls of the type employed as ball bearings.

The spherical bodies are loosely supported between the spaced-apart edges of the annular body 1 so that they may freely move in directions axially, radially and circumferentially of the ring. The diameter of the spherical bodies is preferably of a size sufficiently small for the spherical bodies to enter partway between some of the openings of the annular body, as for instance the space between the connecting portions 4, or the space between the rows of segments at the outer periphery of the ring.

To prevent these spherical bodies from passing radially out through the space between the oil metering edges as in handling, special retaining means have been provided, consisting of bent portions 8 and 9, of each of the segments 2 and 3 respectively, which are axially bent toward one another to leave an intervening space which is slightly less than the diameter of the spherical bodies 7. The edges of the bent portions are formed with oil scraping surfaces substantially parallel with the axis of the ring and adapted to metering oil in the usual manner.

In assembling the ring one procedure consists in forming a retaining ring with the bent over edge portions, in the manner described, and thereafter inserting the scavenger elements through one of the ends of the ring. Any desired number of the spherical bodies may be used and one suitable arrangement consists of a number of the steel balls necessary to taking up about one-half of the available space between the ends of the ring considered circumferentially thereof. In Fig. 14 I have illustrated one suitable means for closing the ends of a ring containing scavenger elements consisting of an inwardly bent connecting portion 23 which effectually prevents escape of the elements out of the ring. This arrangement may be employed also at the opposite end of the ring.

An important feature of the invention is the combination of an oil control piston ring and a plurality of relatively small scavenger elements of spherical shape. The spherical shape facilitates movement of the scavenger elements within the ring, allowing each of the scavenger elements to be in rolling contact with a relatively large surface area of the piston ring. The steel balls tend to move circumferentially around the ring, and also axially and radially of the ring between the rows of segments 2 and 3.

As the ring reciprocates in a cylinder, the steel balls, from time to time, are thrown against the cylinder wall, which causes the balls to spin at high speeds. The spinning action of the balls, in addition to their circumferential movement relative to the ring, is highly effective in further preventing carbon deposits at all points which are contacted by the balls.

It should be observed that in piston rings having a single scavenger element, the scavenger element itself may tend to acquire carbon deposits throughout a part of its surface area. In the present invention, the peripheral scavenger elements, by rotating and spinning around in the ring as described, insure prevention of carbon deposits throughout their surfaces.

The spherical bodies 7 may be employed with various other types of piston rings having spaced-apart oil metering edges. For example, in Fig. 4 I have illustrated scavenger elements 7 associated with a piston ring 10 of the conventional C-type, having oil passages 11 and bent over retaining edges 12. The ring 10 may be one formed from cast metal or from resilient sheet metal, or other substances.

Similarly the scavenger elements may be modified in various ways. In Figs. 7 and 8 a modification of the ball type of scavenger element has been illustrated, in which a plurality of spherical bodies 13 are strung on a wire element 14, which is formed with projections 15 for maintaining the bodies 13 in substantially spaced-apart relation. The wire 14 is adapted to be supported around the periphery of a ring 1 such as that illustrated in Figs. 1-3 inclusive. The scavenger elements may also be provided of elliptical shape and various other forms.

The bent-over portions illustrated in Figs. 1-4 inclusive may be incorporated with other types of oil metering piston rings in which a plurality of spherical bodies may be desired to be employed. For example, Figs. 12 and 13 illustrate such a ring in which separate C-type oil scraping rings 16 and 17 are held in spaced-apart relation by means of expander member 18, having spacer portions 19. The spacer portions of the expander 18 provide sections in which are loosely supported spherical bodies 20, retained by bent-over edges 21 and 22 at the outer periphery of the ring. Figs. 12 and 13 are further illustrative of a three-piece oil ring of conventional type having separate scavenger elements associated therewith.

In some cases, it may be desirable to provide modification of the retaining means for holding scavenger elements in a ring of the type described, and in Figs. 5 and 6 I have illustrated a piston ring construction embodying retaining means which is attached to a ring member after installation of the spherical bodies. Numeral 24 refers to an annular body of the same general type as that illustrated in Figs. 1-3 inclusive. The edges of the annular body, made up of a plurality of spaced-apart segments, are formed with slots 25 and 26, along which is slidably keyed a clip member 27, consisting of a wire generally bent upon itself to provide a series of U-shaped portions having axially extending legs 28 adapted to prevent passage of scavenger elements 29 radially outward from between the edges of the annular body.

The clip member 27 may be very cheaply manufactured and provided in suitable ring lengths, and is very quickly assembled in rings of the type described. The legs 28 may be spaced apart in any desired manner and effectively enclose the scavenger elements without adding bulky portions tending to interfere with the oil metering action of the ring.

Figs. 9, 10 and 11 illustrate other modified retaining means which may be separately associated with a piston ring, and which provide for maintaining the sperical bodies in circumferentially spaced-apart relation around the piston ring. Numerals 30 and 31 refer to spaced-apart sides of piston ring material made up of circumferentially spaced-apart segments which are resiliently supported by connecting members 32. The connecting members 32 are circumferentially spaced apart so as to prevent the scavenger elements 33 from passing therebetween in a direction radially of the ring.

Further limitation of movement of the spherical bodies may be provided for by bending a clip member to provide a series of cells within which the balls are retained, irrespective of the position which a ring may assume.

In Figs. 15-17 inclusive, a ring 34 of the same general type as that illustrated in Figs. 1-3 inclusive is provided with a retaining member 35, consisting of a length of resilient wire bent to form a plurality of cells in which are retained scavenger elements 36. The retaining member is formed with upper and lower U-shaped portions connected by axially extending webs, and the axial height of the retaining member is of a size permitting the retaining member to engage resiliently between the sides of the ring 34. Each of the U-shaped portions are effective in holding a scavenger element 36 therein, thus insuring that the action of the scavenger element may continue irrespective of the position the ring may assume. The scavenger elements may be snapped into place within the retaining member, thus providing a desirable way of mounting the balls in the ring. It should be noted that Figs. 12 and 13 also illustrate a means of limiting circumferential movement of scavenger elements. Various other means of thus holding the steel balls may be employed. This may be of particular importance in those cases where a ring is operating in an inclined or inverted position, as for example in some types of aircraft motors.

It will be seen that the ring of the invention includes rotatable scavenger elements highly adapted to reducing and preventing carbon deposits, a number of cheap and easily installed separate retaining means have been provided for holding a plurality of relatively small scavenger elements, and limitation of movement of the scavenger elements has been provided for, to insure operation in all positions which the ring may assume.

While I have shown preferred embodiments of the invention, it should be understood that various changes and modifications may be resorted to, in keeping with the spirit of the invention as defined by the appended claims.

I claim:

1. As an article of manufacture an oil metering ring construction comprising a ring member having a circumferentially extending groove at the outer periphery thereof and a plurality of spherical scavenger elements loosely disposed in the groove.

2. An article of the character described comprising a ring element, a plurality of spherical scavenger means loosely disposed in the ring element, and means associated with the ring element for limiting movement of the spherical scavenger means.

3. As an article of manufacture an oil metering device for use in a piston and cylinder, comprising ring means having circumferentially extending edges spaced apart to provide a continuous oil passage, said ring further including radially extending oil passages which connect with the said first oil passage, a plurality of spherical scavenger bodies loosely disposed in the said first oil passage, and means at the outer periphery of the ring means for limiting movement of the scavenger bodies.

4. An article of the character described comprising ring means having outer peripheral edges axially spaced apart to form an oil passage, said ring means having radially extending oil passages connecting with the said first oil passage, a plurality of spherical bodies loosely disposed between the peripheral edges, and said spherical bodies being of a size adapted to project radially outward beyond the peripheral edges in at least one position therebetween.

5. An article of the character described, comprising a ring member presenting spaced-apart sides, connecting portions for the sides, said connecting portions having radially extending oil passages formed therein, a plurality of scavenger elements loosely mounted between the sides, and means forming a part of the outer peripheral edges of the ring member for retaining the scavenger element.

6. An article of the character described, comprising a ring member presenting spaced-apart sides, connecting portions for the sides, said connecting portions having radially extending oil passages formed therein, a plurality of spherical bodies loosely mounted between the sides, the outer peripheral edges of the sides being axially bent toward one another to provide retaining means for the spherical bodies.

7. An article of the character described comprising a ring member presenting spaced-apart sides, connecting portions for the sides, said connecting portions having radially extending oil passages formed therein, a plurality of spherical bodies loosely mounted between the sides, the outer peripheral edges of the sides being axially bent toward one another to provide retaining means for the spherical bodies, said bent edges of the sides being spaced apart a distance less than the diameter of the spherical bodies.

8. An article of the character described comprising a ring member presenting spaced-apart sides, connecting portions for the sides, said connecting portions having radially extending oil passages formed therein, a plurality of spherical bodies loosely mounted between the sides, the outer peripheral edges of the sides being axially bent toward one another to provide retaining means for the spherical bodies, said bent edges of the sides being spaced apart a distance adapted to permit the spherical bodies to project radially outward from the peripheral edges when the spherical bodies are engaged thereagainst.

9. An article of the character described comprising a ring member presenting spaced-apart sides, means for supporting the sides in spaced-apart relation, said means for supporting the sides in spaced-apart relation having radially extending oil passages formed therein, a plurality of scavenger elements loosely mounted between the sides in circumferentially spaced-apart relation, and means at the outer periphery of the ring member for limiting movement of the scavenger elements in a direction radially outward of the ring member.

10. An article of the character described comprising a split ring member presenting spaced-apart sides, connecting portions for the sides, said connecting portions having radially extending oil passages formed therein, a plurality of spherical scavenger elements loosely mounted between the sides, means for limiting movement of the spherical scavenger elements in a direction radially outward of the ring and means at the split ends of the ring member for limiting movement of the spherical scavenger elements in a direction circumferentially of the ring.

11. An article of the character described comprising a ring member presenting spaced-apart sides, intermediate portions for maintaining the sides in spaced-apart relation, said intermediate portions having radially extending oil passages formed therein, a plurality of scavenger elements loosely mounted between the sides, retaining means mounted in the ring member between the scavenger elements and the outer periphery of the ring member, said retaining means adapted to limit movement of the scavenger elements in a direction radially outward.

12. An article of the character described comprising a ring member presenting spaced-apart sides, connecting portions for the sides, said connecting portions having radially extending oil passages formed therein, a plurality of rotatable scavenger elements loosely mounted between the sides, a continuous ring element adjustably mounted between the sides of the ring member and extending circumferentially therearound in spaced relation to the inner periphery of the ring member, thereby to limit movement of the rotatable scavenger elements in a direction radially outward of the ring member.

13. An article of the character described comprising a ring member presenting space-apart sides, connecting portions for the sides, said connecting portions having radially extending oil passages formed therein, a plurality of rotatable scavenger elements loosely mounted between the sides, said sides being formed with circumferentially extending grooves, and an annular retaining member adjustably engaged in the grooves, in spaced relation to the connecting portions, for the purpose of limiting movement of the scavenger elements.

14. As an article of manufacture a piston ring comprising a ring member presenting spaced-apart sides, connecting portions for the sides, said connecting portions having radially extending oil passages formed therein, a plurality of scavenger elements loosely mounted between the sides, annular retaining means adjustably engaged between the said sides, said retaining means having radially extending portions which limit movement of the scavenger elements in directions circumferentially and radially of the ring.

15. A piston ring comprising spaced-apart sides, means for maintaining the sides in spaced-apart relation, said means for maintaining the spaced-apart relation having radially extending oil passages formed therein, an annular retaining member adjustably engaged between the sides, said annular member being bent to provide a plurality of annularly arranged cells, and scavenger elements loosely maintained in said cells.

16. As an article of manufacture a piston ring comprising a ring member presenting spaced-apart sides, connecting portions for the sides, said connecting portions having radially extending oil passages formed therein, a plurality of scavenger elements loosely mounted between the sides, annular retaining means adjustably engaged between the said sides, said retaining means consisting of a plurality of bent U-shaped portions adapted to limit movement of the scavenger elements in directions radially and circumferentially of the ring.

17. As an article of manufacture a piston ring comprising spaced-apart sides, connecting portions for the sides, said connecting portions having radially extending oil passages formed therein, a plurality of spherical bodies loosely mounted between the sides, a retaining ring adjustably engaged between the sides, said retaining ring presenting a series of cells, each of the cells being adapted to maintain one of the said spherical bodies loosely held therein.

THOMAS A. BOWERS.